United States Patent
Qiu et al.

(10) Patent No.: US 8,543,640 B2
(45) Date of Patent: Sep. 24, 2013

(54) METHOD AND APPARATUS FOR MANAGING USER ENDPOINT DEVICES IN A COMMUNICATION NETWORK

(75) Inventors: Chaoxin Qiu, Austin, TX (US); Robert Dailey, Austin, TX (US); Jeffrey Scruggs, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 805 days.

(21) Appl. No.: 12/566,978

(22) Filed: Sep. 25, 2009

(65) Prior Publication Data

US 2011/0078229 A1    Mar. 31, 2011

(51) Int. Cl.
*G06F 15/16* (2006.01)
*G06F 15/173* (2006.01)

(52) U.S. Cl.
USPC ............ 709/203; 709/219; 709/225; 709/228

(58) Field of Classification Search
USPC ....................................... 709/203
See application file for complete search history.

(56) References Cited

U.S. PATENT DOCUMENTS

| | | | |
|---|---|---|---|
| 2003/0076816 A1* | 4/2003 | Naranjo et al. | 370/352 |
| 2004/0190696 A1* | 9/2004 | Fleischer et al. | 379/114.01 |
| 2005/0078611 A1* | 4/2005 | Adams et al. | 370/254 |
| 2006/0142000 A1* | 6/2006 | Rubenstein | 455/428 |
| 2007/0043829 A1* | 2/2007 | Dua | 709/219 |
| 2007/0058792 A1* | 3/2007 | Chaudhari et al. | 379/88.17 |
| 2007/0115922 A1* | 5/2007 | Schneider et al. | 370/352 |
| 2007/0121584 A1* | 5/2007 | Qiu et al. | 370/352 |
| 2007/0140262 A1* | 6/2007 | Wang | 370/395.52 |
| 2007/0160058 A1* | 7/2007 | Zhou et al. | 370/395.2 |
| 2008/0144605 A1* | 6/2008 | Qiu et al. | 370/352 |
| 2010/0153563 A1* | 6/2010 | Ku | 709/228 |
| 2010/0241748 A1* | 9/2010 | Ansari et al. | 709/225 |

* cited by examiner

*Primary Examiner* — Richard G Keehn
(74) *Attorney, Agent, or Firm* — Guntin & Gust, PLC; Andrew Gust (57) ABSTRACT

A system that incorporates teachings of the present disclosure may include, for example, a user endpoint device having a controller to submit a query to a Domain Name System (DNS) for information associated with a Fully Qualified Domain Name (FQDN) assigned to at least one of a Local Access Transport Area (LATA) or rate center of the user endpoint device, and receive from the DNS one or more descriptors of one or more session border controllers, wherein the one or more descriptors are associated with the FQDN of the user endpoint device. Additional embodiments are disclosed.

21 Claims, 11 Drawing Sheets

Illustrative DNS SRV Assignments

West Region

; SRV records for subscribers designated to Dallas Server Office
; Assign higher priority 0 and larger weight 3 to ipbe in Dallas SO

| _sip_udp.sbcwest.att.net | SRV | 0 | 3 | 5060 | ims-core1.att.net |
| | SRV | 1 | 0 | 5060 | ims-core2.att.net |

| ims-core1 | A | 142.30.79.10 |
| ims-core2 | A | 142.30.89.10 |

East Region

; SRV records for subscribers designated to Philadelphia Server Office
; Assign higher priority 0 and larger weight 3 to ipbe in Philadelphia SO

| _sip_udp.sbceast.att.net | SRV | 0 | 3 | 5060 | ims-core2.att.net |
| | SRV | 1 | 0 | 5060 | ims-core1.att.net |

| ims-core1 | A | 142.30.79.10 |
| ims-core2 | A | 142.30.89.10 |

Illustrative Directory of LATA-based Virtual FQDN Assignment

| LATA ID | Virtual FQDN Assigned | Number of Subscribers Assigned | Maximal Number of Subscribers |
|---|---|---|---|
| 320 | _sip._udp.lata320AA.ims.uverse.att.net | 1900 | 2000 |
| 320 | _sip._udp.lata320AB.ims.uverse.att.net | 1800 | 2000 |
| 320 | _sip._udp.lata320AC.ims.uverse.att.net | 1750 | 2000 |
| 320 | _sip._udp.lata320AD.ims.uverse.att.net | 1950 | 2000 |
| 320 | _sip._udp.lata320AE.ims.uverse.att.net | 851 | 2000 |
| 358 | _sip._udp.lata358AA.ims.uverse.att.net | 1788 | 2000 |
| 358 | _sip._udp.lata358AB.ims.uverse.att.net | 1850 | 2000 |
| 358 | _sip._udp.lata358AC.ims.uverse.att.net | 1800 | 2000 |
| 358 | _sip._udp.lata358AD.ims.uverse.att.net | 1850 | 2000 |
| 358 | _sip._udp.lata358AE.ims.uverse.att.net | 1100 | 2000 |
| 558 | _sip._udp.lata558AA.ims.uverse.att.net | 1650 | 2000 |
| 558 | _sip._udp.lata558AB.ims.uverse.att.net | 1700 | 2000 |
| 558 | _sip._udp.lata558AC.ims.uverse.att.net | 1400 | 2000 |
| 730 | _sip._udp.lata730AA.ims.uverse.att.net | 1800 | 2000 |
| 730 | _sip._udp.lata730AB.ims.uverse.att.net | 1750 | 2000 |
| 730 | _sip._udp.lata730AC.ims.uverse.att.net | 1900 | 2000 |
| 730 | _sip._udp.lata730AD.ims.uverse.att.net | 700 | 2000 |

Illustrative Directory of Virtual FQDN To SRV Record Assignment

| Virtual FQDN Assigned | Primary SRV | Secondary SRV |
|---|---|---|
| _sip_udp.lata320AA.ims.uverse.att.net | priority = 10<br>weight = 5<br>port = 5060<br>svr hostname = phlpa01sda01ge0v1.ims.uverse.att.net | priority = 20<br>weight = 5<br>port = 5060<br>svr hostname = rdltx01sda01ge0v1.ims.uverse.att.net |
| _sip_udp.lata358AA.ims.uverse.att.net | priority = 10<br>weight = 5<br>port = 5060<br>svr hostname = phlpa01sda03ge0v1.ims.uverse.att.net | priority = 20<br>weight = 5<br>port = 5060<br>svr hostname = rdltx01sda03ge0v1.ims.uverse.att.net |
| _sip_udp.lata558AA.ims.uverse.att.net | priority = 10<br>weight = 5<br>port = 5060<br>svr hostname = chlil01sda01ge0v1.ims.uverse.att.net | priority = 20<br>weight = 5<br>port = 5060<br>svr hostname = phlpa01sda01ge0v1.ims.uverse.att.net |
| _sip_udp.lata730AC.ims.uverse.att.net | priority = 10<br>weight = 5<br>port = 5060<br>svr hostname = sdlca01sda01ge0v1.ims.uverse.att.net | priority = 20<br>weight = 5<br>port = 5060<br>svr hostname = rdltx01sda01ge0v1.ims.uverse.att.net |

Illustrative Directory of S/BC's FQDN and IP Address Assignment

| Access Offices | S/BC FQDN | IP Address |
|---|---|---|
| Chicago | chil01sda01ge0v1.ims.uverse.att.net | 142.80.79.10 |
| San Diego | sdlca01sda01ge0v1.ims.uverse.att.net | 142.90.79.10 |
| Philly | ph1pa01sda01ge0v1.ims.uverse.att.net | 142.60.79.10 |
|  | ph1pa01sda03ge0v1.ims.uverse.att.net | 142.60.79.20 |
| Richardson | rd1tx01sda01ge0v1.ims.uverse.att.net | 142.30.79.10 |
|  | rd1tx01sda03ge0v1.ims.uverse.att.net | 142.30.79.20 |

900
FIG. 9

METHOD AND APPARATUS FOR MANAGING USER ENDPOINT DEVICES IN A COMMUNICATION NETWORK

FIELD OF THE DISCLOSURE

The present disclosure relates generally to user endpoint device management, and more specifically to a method and apparatus for managing user endpoint devices in a communication network.

BACKGROUND

When a service provider of communications deploys a communications network, there can be many challenges. Among them include without limitation the cost of deployment, the cost of adding network equipment to accommodate subscriber growth, maintenance of the network, serviceability of the network, and managing the addition of new subscribers to the network—just to mention a few.

DETAILED DESCRIPTION

One embodiment of the present disclosure entails a method to associate a plurality of logical Fully Qualified Domain Names (FQDNs) with at least one of a corresponding plurality of Local Access Transport Area (LATAs) or rate centers, and assign to each of the plurality of logical FQDNs a primary record and a secondary record, wherein the primary record comprises a descriptor of a primary session border Controller (SBC), and wherein the secondary record comprises a descriptor of a secondary SBC.

One embodiment of the present disclosure entails a Domain Name System (DNS) server having a controller to record a plurality of logical FQDNs associated with at least one of a corresponding plurality of LATAs or rate centers, receive a query from a user endpoint device for information associated with a select one of the logical FQDNs, and transmit to the user endpoint device the requested information.

One embodiment of the present disclosure entails a user endpoint device having a controller to submit a query to a Domain Name System (DNS) for information associated with a logical Fully Qualified Domain Name (FQDN) assigned to at least one of a Local Access Transport Area (LATA) or rate center of the user endpoint device, and receive from the DNS one or more descriptors of one or more session border Controllers (SBCs), wherein the one or more descriptors are associated with the logical FQDN of the user endpoint device.

Figure 1:
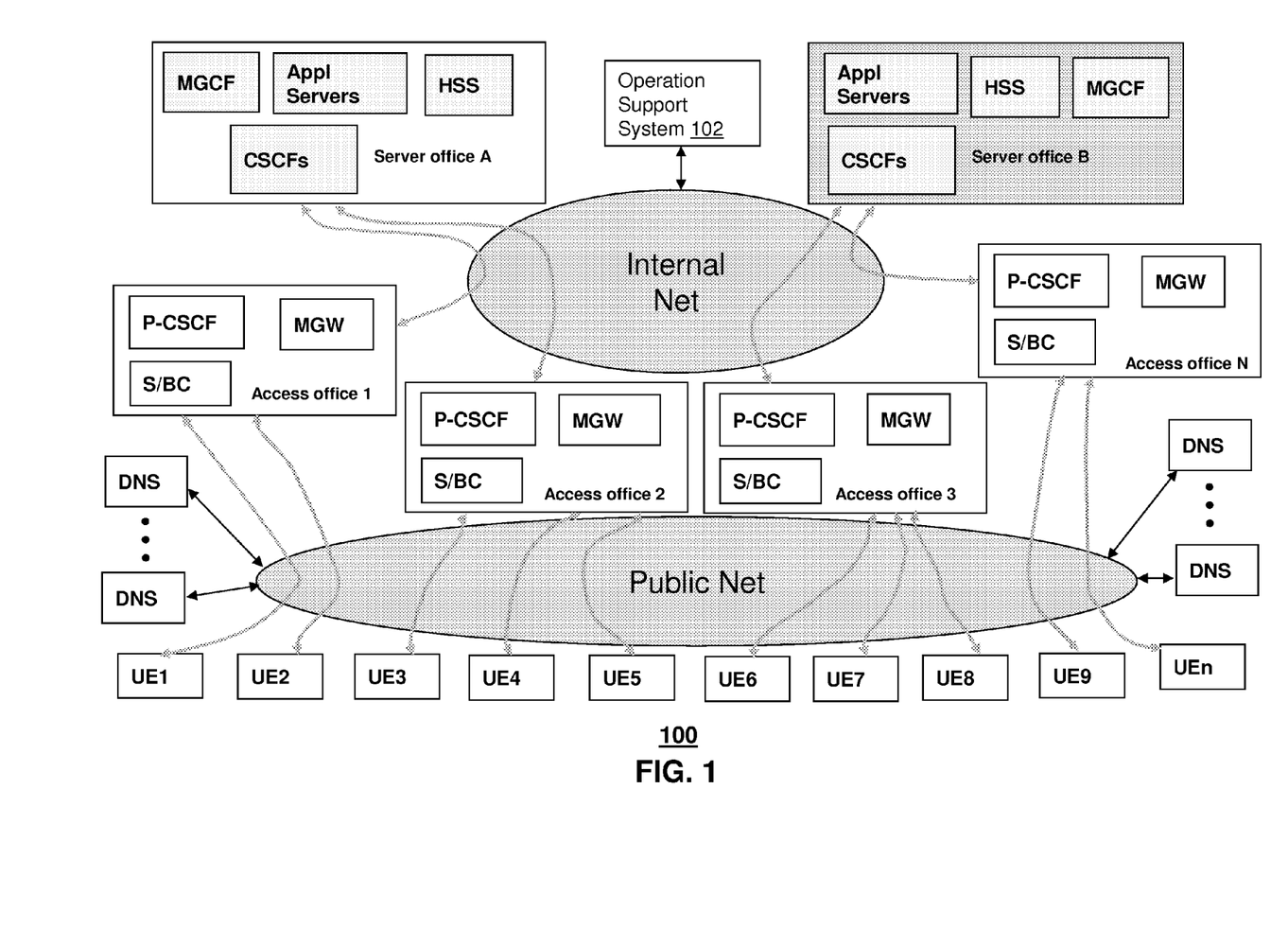
FIGS. 1-2 depict illustrative embodiments of a communication system.
Figure 2:
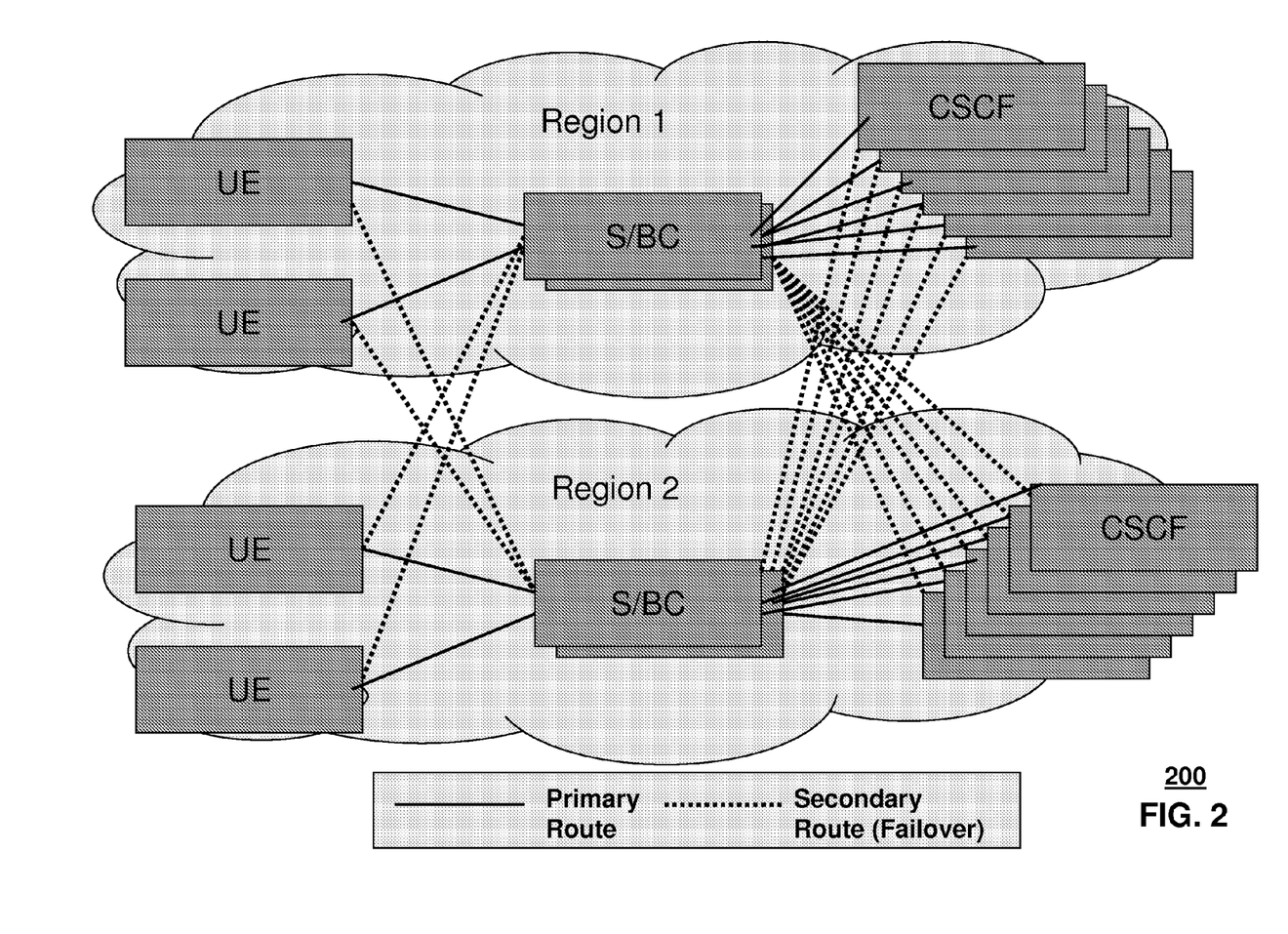

FIGS. 1-2 depict illustrative embodiments of a communication system. FIG. 1 depicts a Next Generation Network (NGN) comprising network elements that among other things can provide subscriber services such as Voice over Internet Protocol (VoIP), traditional Public Network Switched Network (PSTN), and a hybrid communications between VOID and PSTN communication devices. NGN networks can have Access Offices which can communicate with subscriber devices in the form of user endpoint (UE) communication devices (herein referred to as UEs) over a Public Network of a service provider. The Public Network can be third party ISPs that provide Internet access to UEs in the last mile. The Access Offices can include among other things a Session Border Controller (S/BC) for interfacing with the UEs and thereby providing communication services thereto by way of a Proxy Call Session Control Function (P-CSCF) which communicates with a Server Office over an Internal Network of the service provider such as a Multi-Protocol Label Switching (MPLS) network. The MGW can be used to support hybrid communications between the UEs such as VoIP audio packets and PSTN TDM-based voice trunks.

The S/BC can submit communication requests initiated by the UEs to the Server Office via a P-CSCF. The Server Office in turn can manage such requests utilizing combinations of CSCFs, Application Servers, a Media Gateway Control Function (MGCF) which supports PSTN communications, and a Home Subscriber Server (HSS). The network elements of the Server Office singly or in combination provide resources to establish communications between UEs of a VoIP or PSTN type. The service provider of the communication network of FIG. 1 can provision the UEs by way of Domain Name Systems (DNS) servers which can be programmed by the service provider as desired.

The UEs are provisioned by the service provider with necessary information to connect to the NGN communication network of FIG. 1 and to obtain services therefrom. The UEs can request additional contact information of the service provider network from DNS servers on a periodic basis. The information can include information associated with a primary or secondary S/BC of one or more Access Office. As will be shown, the UE preferably registers with an Access Office with the primary S/BC. As shown in FIG. 2, the UE can register with the secondary S/BC as a means to mitigate a communication fault experienced by a network element of an Access Office or a Server Office which causes interruption in communication services provided to the UE.

Figure 3:
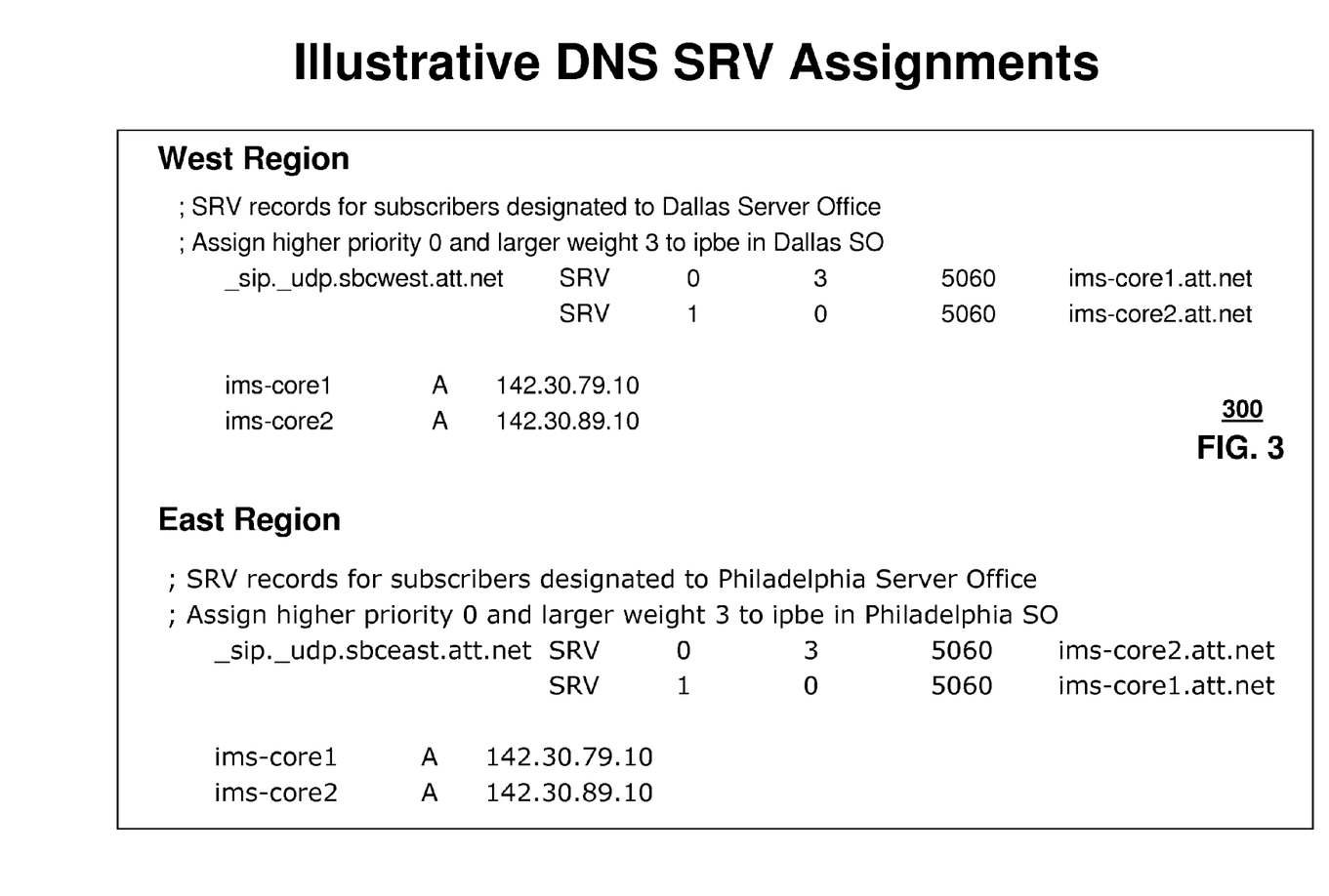
FIG. 3 depicts an illustrative embodiment of provisioning information used by subscriber devices of the communication system of FIGS. 1-2.

FIG. 3 depicts an illustrative embodiment of provisioning information in the form of DNS Serve (SRV) records conforming to standards promulgated by the Internet Engineering Task Force (IETF). FIG. 3 illustrates a first logical Fully Qualified Domain Name (FQDN) associated with a West Region of the United States configured in such a manner that UEs in the West Region are primarily served by a Server Office located in Dallas. FIG. 3 further illustrates a second logical FQDN associated with an East Region of the United States configured in such a manner that UEs in the East Region are primarily served by a Server Office located in Philadelphia. Each logical FQDN can comprise primary and secondary SRV records for directing UEs to a primary or secondary S/BC, respectively, operating in a corresponding Access Office. For illustration purposes only, the first logical FQDN is represented by the character string_sip._udp.sbcwest.att.net, while the second logical FQDN is represented by the character string_sip._udp.sbceast.att.net. Any desirable character arrangement is possible for defining an FQDN.

A UE can be provisioned for example with a logical FQDN such as _sip._udp.sbcwest.att.net (or the other) shown in FIG. 3 by common means (e.g., at point of sale, over-the-air programming for wireless communication devices such as cellular phones, or by way of wireline provisioning). Once it is provisioned, a UE can query a DNS server for the SRV records associated with its logical FQDN according to the flow diagram of FIG. 4. As shown in the flow diagram, the DNS server can supply SRV records responsive to a query with the logical FQDN _sip._udp.sbcwest.att.net.

The priority of the first SRV record, designated by the field with the number "0", supersedes the priority of the second SRV record designated by the field with the number "1". Accordingly the A-record ims-core1.att.net supplied by the DNS server for the first SRV record corresponds to the primary S/BC, while the A-record ims-core2.att.net supplied by the DNS server for the second SRV record corresponds to the secondary S/BC. It should be noted that the primary and secondary S/BC's is determined by the priority field of the SRV records not the order of the SRV records shown in FIG. 3.

Figure 4:
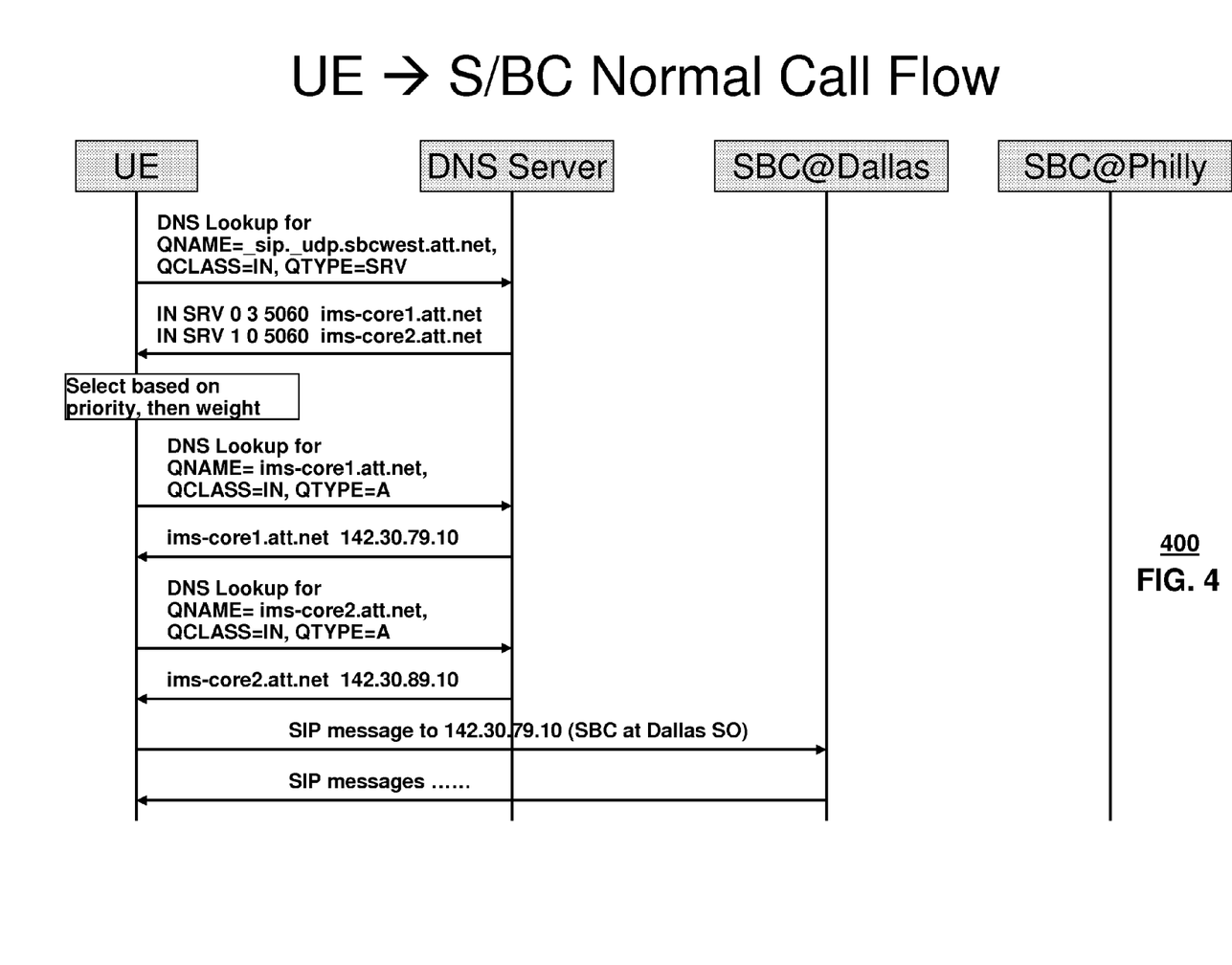
FIGS. 4-5 depict illustrative embodiments of communication flow diagrams between the subscriber device and network elements of the communication system.

With the primary and secondary A-records, a UE assigned to the West Region FQDN (_sip._udp.sbcwest.att.net) can proceed to request the IP address of the primary S/BC (142.30.79.10) followed by the IP address of the secondary S/BC (142.30.89.10). Since the primary SRV record has a higher priority than the secondary SRV record, the UE chooses to register with the primary S/BC as shown in the illustration of FIG. 4, which in this example is situated in Dallas. If the UE is unable to register with the primary S/BC, it reverts to the secondary S/BC as depicted in the call flow diagram of FIG. 5.

It should be noted that the logical FQDN can be associated with any S/BC of any Access Office. Referring back to FIG. 3, the logical FQDN of the East Region (_sip._udp.sbceast.att.net) is programmed with a reverse order of the primary and secondary SRV records of the FQDN (_sip._udp.sbcwest.att.net) of the West Region. Thus a UE provisioned with the logical FQDN of the East Region shown in FIG. 3 will register with the primary S/BC situated in Philadelphia, and will rely on the secondary S/BC situated in Dallas for backup services. As such, UEs in the East region, provisioned with _sip._udp.sbceast.att.net, will use ims-core2.att.net since it has the priority 0, which is the higher priority.) The ability to associate the logical FQDN with any S/BC of any region or Access Office provides a service provider a means to manage the distribution and reallocation of UEs in an NGN network.

Figure 6:
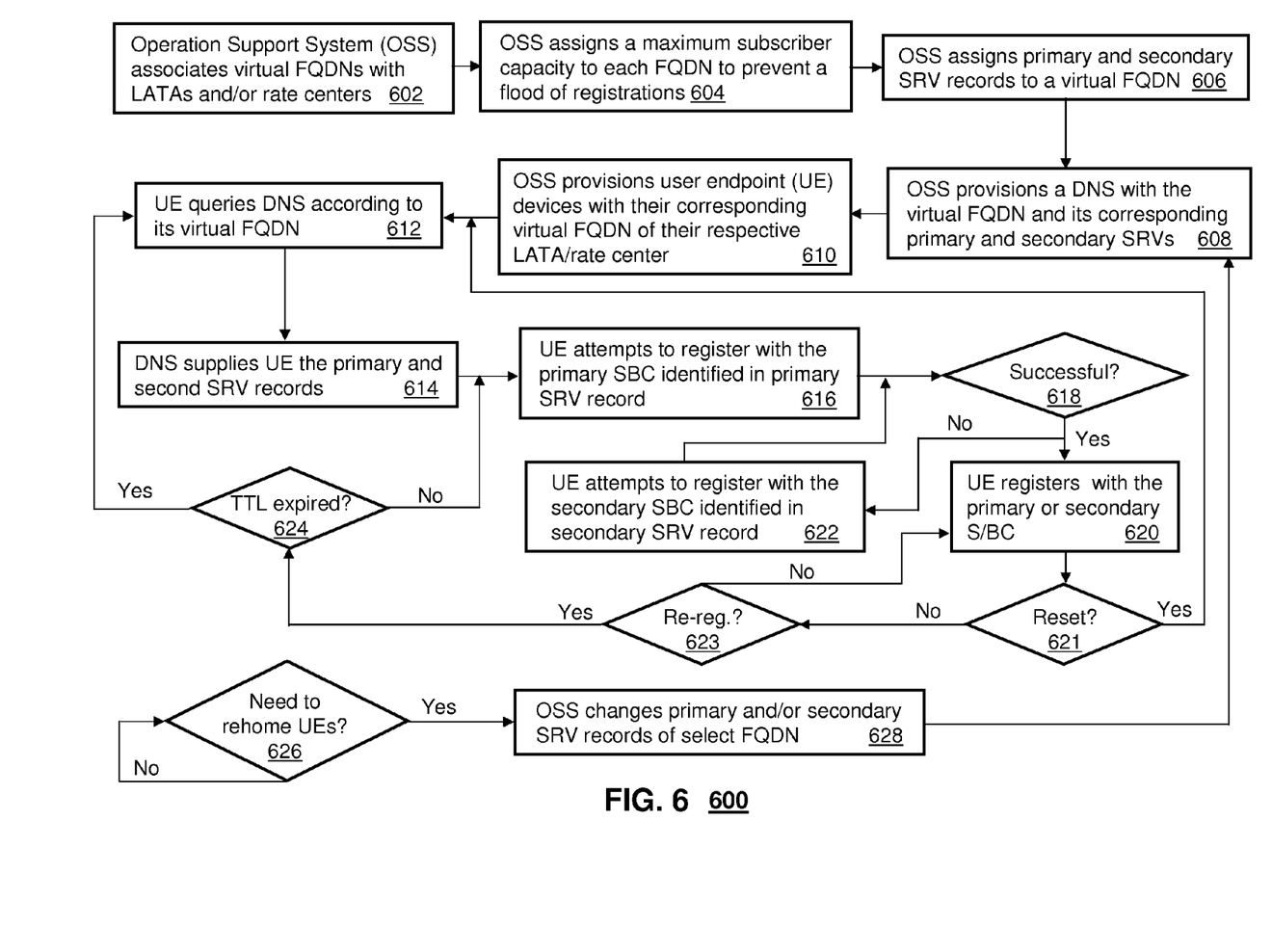
FIG. 6 depicts an illustrative method operating in portions of the communication system of FIGS. 1-2.

Method 600 of FIG. 6 depicts an illustrative embodiment for managing UEs in an NGN network. Method 600 can be implemented in part with an Operation Support System (OSS) 102 such as shown in FIG. 1. The OSS 102 can represent one or more computing systems such as servers, mainframes, or other suitable computing resources. Although the OSS 102 is illustrated as a centralized system coupled to the Server and Access Offices by way of the internal network, the OSS 102 can alternatively be a distributed system with computing components located anywhere in the NGN network of FIG. 1.

With this in mind, method 600 can begin with step 602 where the OSS 102 is programmed to associate logical FQDNs with Local Access Transport Areas (LATAs) and/or rate centers. LATA is a term used in telecommunications which can represent geographic areas within which the divested Regional Bell operating Companies (RBOCs) are permitted to offer exchange telecommunication services. LATAs can be subdivided into rate centers in the form of Number Plan Areas (NPAs or area codes) and three digit entity codes commonly referred to as NXX. Logical FQDNs can instead be associated with just rate centers. From these illustrative embodiments, it should be evident that any suitable geographical designation can be associated with logical FQDNs. Thus, the present disclosure contemplates logical FQDNs associated with LATAs, rate centers, other geographic designations, or combinations thereof. For illustration purposes only, however, the present disclosure describes LATA-based FQDNs from this point forward.

Figure 7:
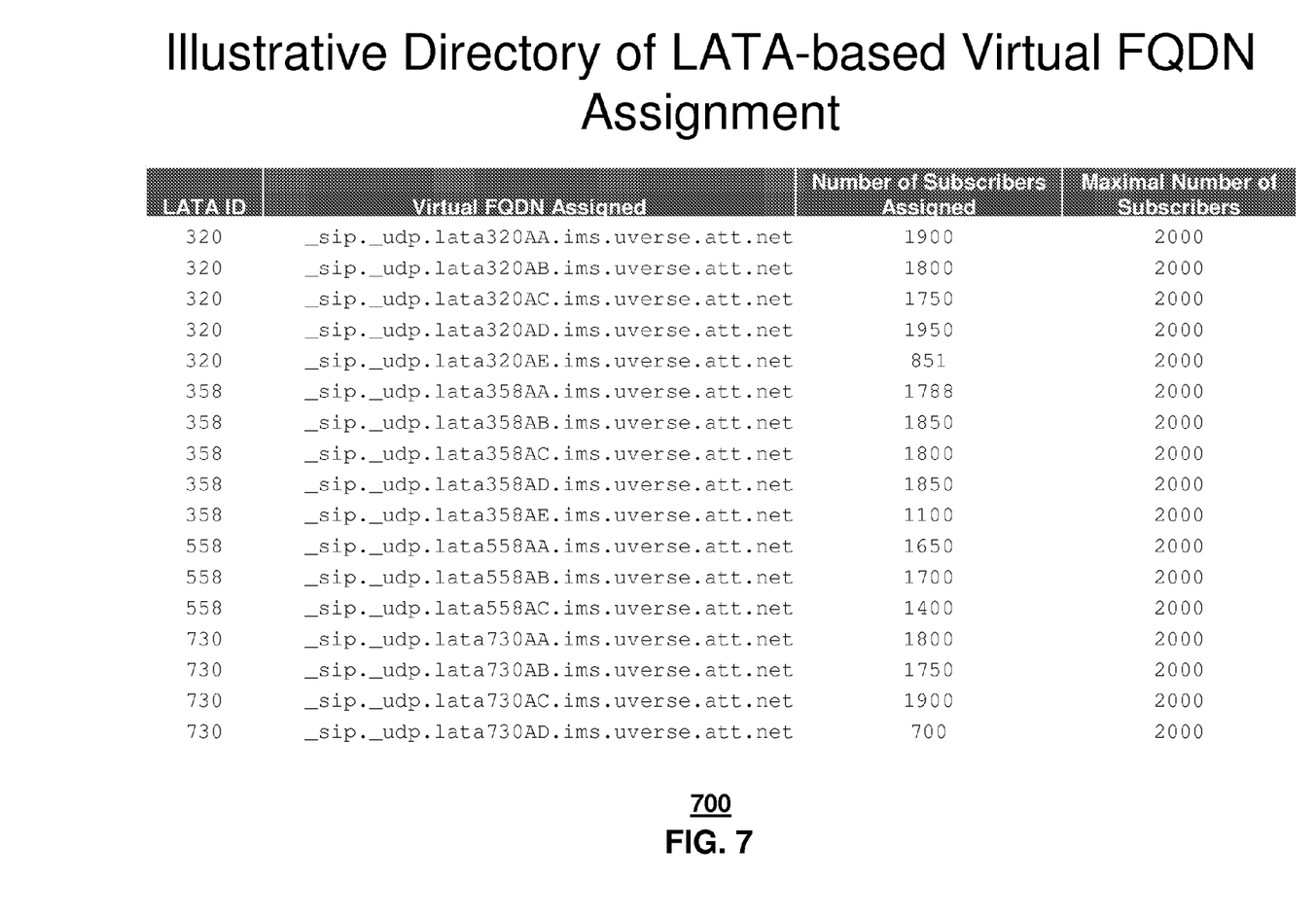
FIGS. 7-10 depict illustrative embodiments of the method of FIG. 6.

FIG. 7 depicts an illustration of logical FQDNs having LATA associations. The LATA-based FQDNs and subdivisions thereof can be stored by the OSS 102 as a directory in a common database system. The OSS 102 can be programmed to record in the database and thereby track the number of UE devices assigned to each logical FQDN. It should be noted that not all logical FQDNs need to be in use. Some logical FQDNs may in fact have no UEs assigned to them yet, and only until such time there is a subscriber need would such FQDNs be used.

Figure 8:
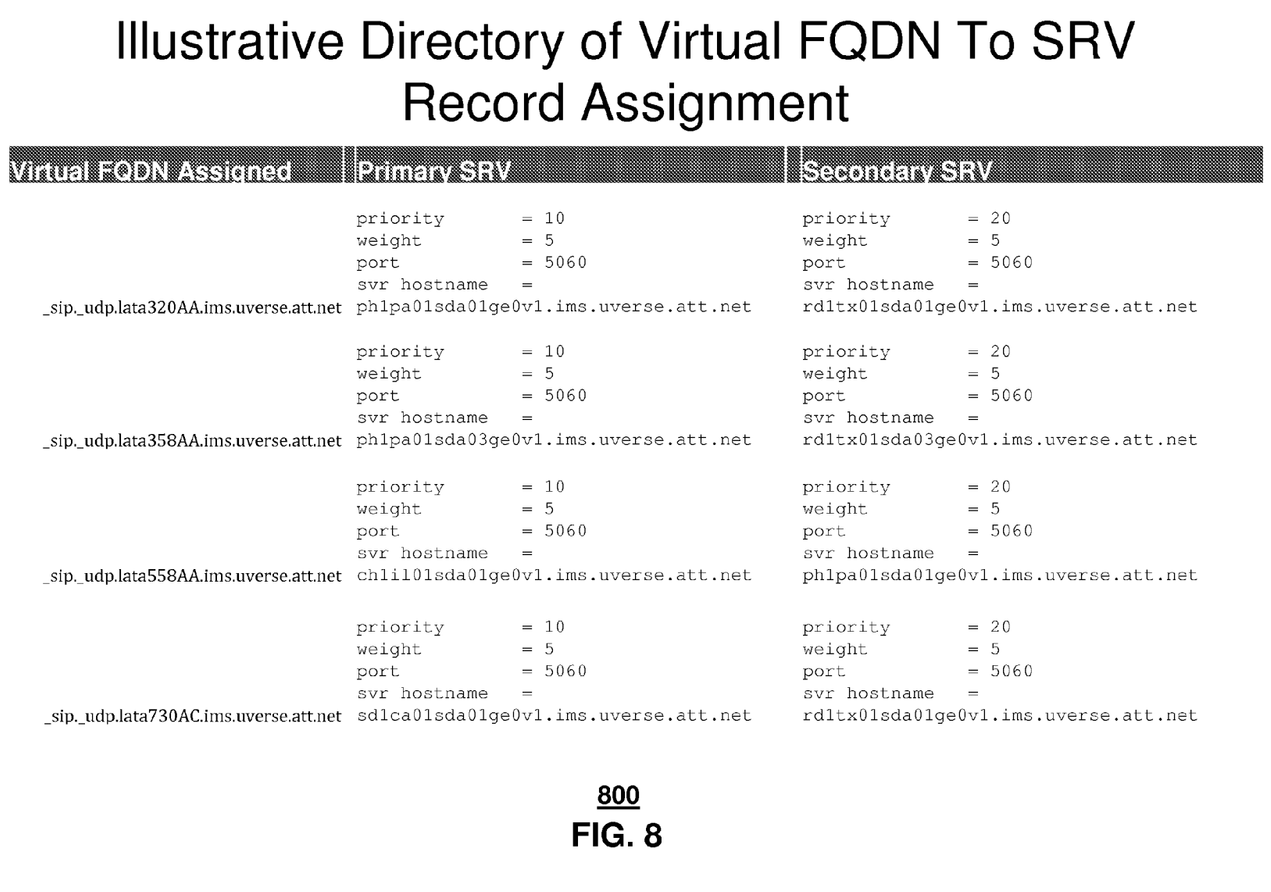
Figure 9:
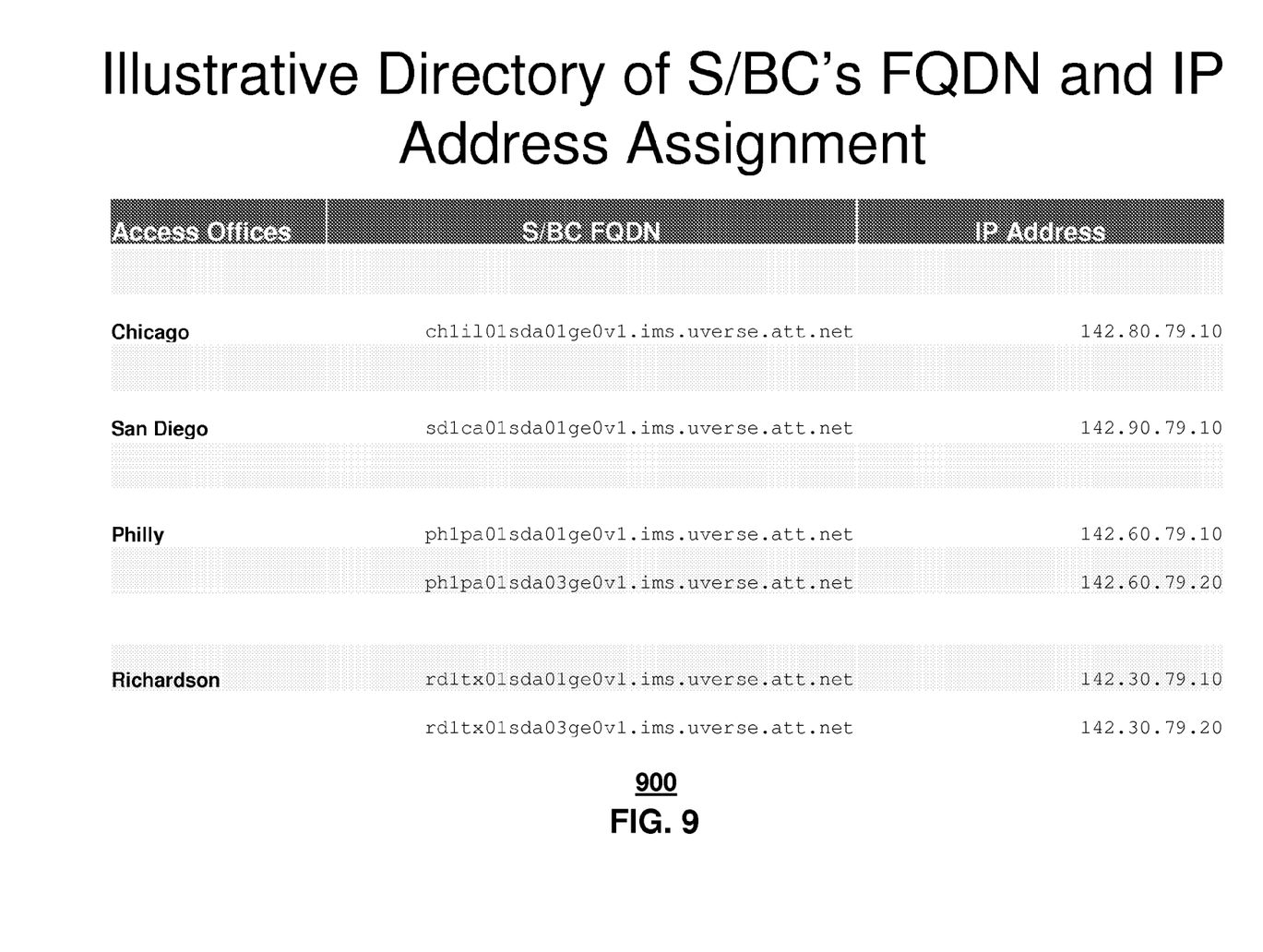

In step 604 the OSS can assign each logical FQDN a maximum subscriber capacity to prevent a flood of registrations by UEs during operations. In the same database or another database, the OSS 102 can be programmed in step 606 to record a directory of assignments of primary and secondary SRV records to each logical FQDN as shown in FIG. 8. The IP addresses assigned to the primary and secondary records can be stored in the same directory of SRV records or in yet another database. The IP addresses represent the contact interfaces of S/BCs deployed in various Access Offices as shown in FIG. 9. As the NGN network expands and new Access Offices are installed, more S/BCs can be deployed with their IP addresses assigned. Once the logical FQDN have been assigned with primary and secondary SRV records as shown in FIGS. 7-9, the OSS 102 can be directed to provision in step 608 one or more DNS servers such as shown in FIG. 1 with the FQDNs and their corresponding SRV record assignments.

Upon making the FQDNs and their corresponding SRV records available to UEs by way of the DNS servers, the service provider can provision in step 610 UEs with a select one of the FQDNs at a point of sale (POS), over-the-air, or by landline communications as previously mentioned. The service provider can provision the UEs with a corresponding logical FQDN according to the UE subscriber's LATA as well as other possible subdivisions such as the subscriber's assigned rate center. In this step, the OSS 102 can be notified of the provisioning of the UE (by the POS or otherwise) to maintain up-to-date records of the number of subscribers assigned to the FQDN as shown in FIG. 7.

To establish communication with the NGN network of FIG. 1, the UE can be programmed to query the DNS server in step 612 to retrieve the primary and secondary SRV records and their corresponding IP addresses as previously described in FIG. 4. Once the SRV records are retrieved, the UE can be programmed in step 616 to attempt registration with the primary S/BC according to its IP address. If the UE is able to successfully establish communications with the Access Office in step 618, the UE eventually registers with the NGN network in step 620 according to common registration processes used by Access and Server Offices.

Figure 5:
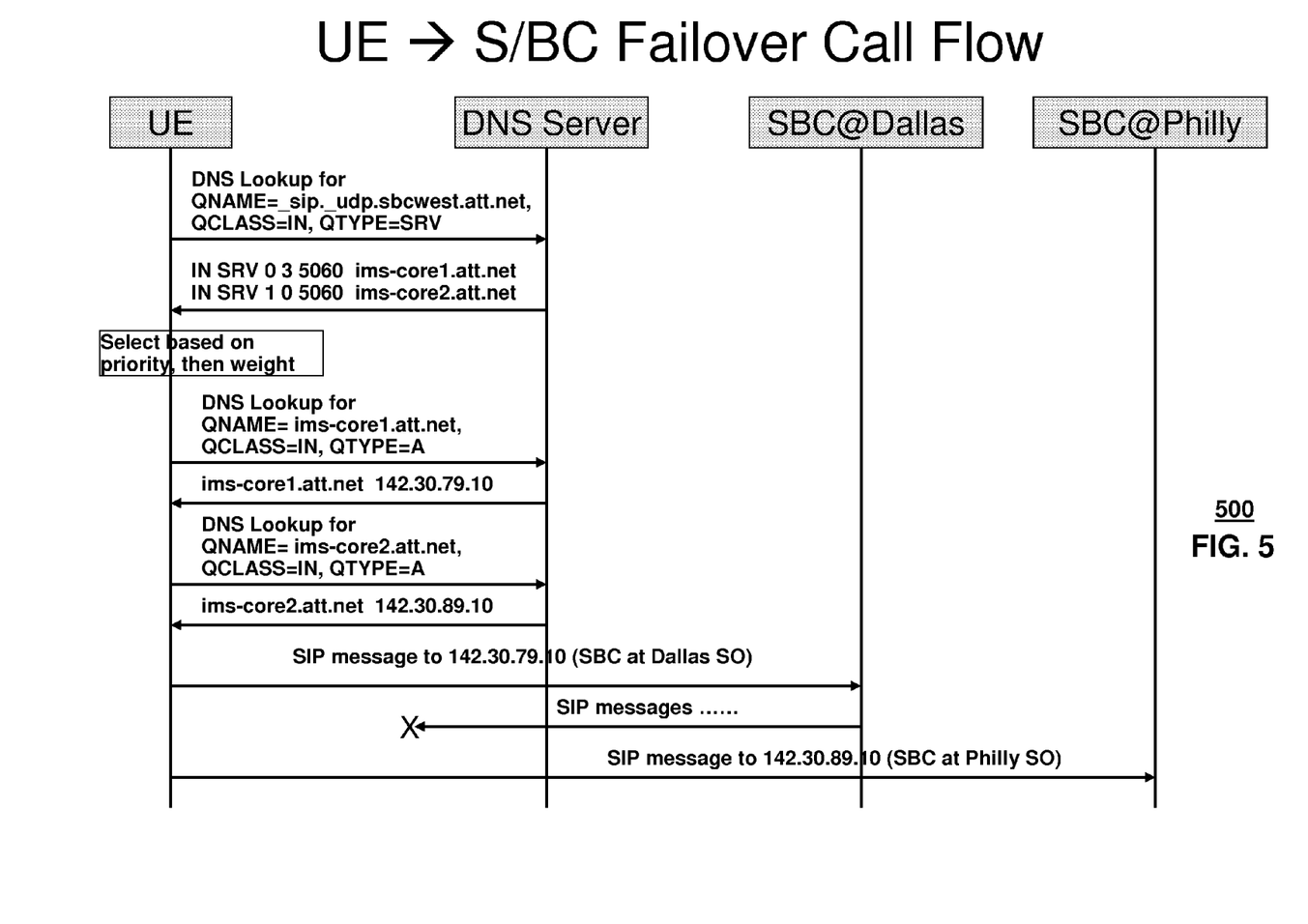

When the UE is unable to establish communication with the Access Office from which the primary S/BC operates due to a fault or interruption in any intermediate communication element between the Access and Server Offices, the UE can revert to step 622 where it attempts to register with the secondary S/BC which may operate in an Access Office different from the Access Office of the primary S/BC as previously illustrated in FIG. 5. Once the UE has registered with the NGN network in step 620 by way of either the primary or secondary S/BC, it can engage in communications with other UEs in the NGN network.

If the UE experiences a soft or hard reset (e.g., a power cycle or software reset) all provisioning information may be lost. After a reset in 621, the UE can be directed to step 612 where it resubmits a query to the DNS server according to its FQDN and restarts the registration process as previously described. If a reset condition has not occurred, the UE can proceed to step 623 where it determines if re-registration is required. Re-registration is a common process required by UEs in NGN networks. The UE can have a re-registration timer that triggers more frequently than a Time-to-Live (TTL) indicator that provides a refresh period for querying the DNS server. For instance, the NGN network may require UEs to re-register every 30 minutes with the S/BC, while requiring re-query with a DNS server every 2 hours.

With this in mind, if the UE re-registration timer has not expired, then it can return to step 620 where it remains registered to the S/BC as previously described. If, however, the re-registration timer has expired in step 623, the UE can proceed to step 624 to determine if the TTL timer has also expired thereby requiring a refresh of SRV records according to its FQDN, and a re-invocation of the registration process.

If the TTL timer has not expired, then the UE can proceed to step 616 where it will re-register with the primary S/BC (or the secondary S/BC if the UE is unsuccessful in registering with the primary S/BC) as previously described. If the TTL timer has expired in step 624 (independent of whether the re-registration timer has expired), the UE can be directed to step 612 where it queries the DNS server again according to its FQDN, thereby repeating the registration sequence previously described. If the primary or secondary SRV records of the FQDN have changed, then the UE will register with a different primary or secondary S/BC without necessarily changing the LATA-based FQDN of the UE.

The service provider may have reasons why it may want to rehome UEs to other Access Offices and/or S/BCs. For instance during maintenance or network upgrades, the service provider may decide to rehome UEs to another S/BC while maintenance or repairs are taking place. In another instance, a UE situated in Chicago may have been assigned to an S/BC of an Access Office in Philadelphia temporarily until such time that an Access Office in Chicago has been established. Temporary assignments or transitions between Access Offices can be accomplished by re-provisioning DNS servers with new SRV records for one or more LATA-based FQDNs without changing the LATA-based FQDNs of the UEs. Avoiding changes to the logical FQDN of many, and perhaps millions of, UEs can save a service provider significant costs in operations.

Figure 10:
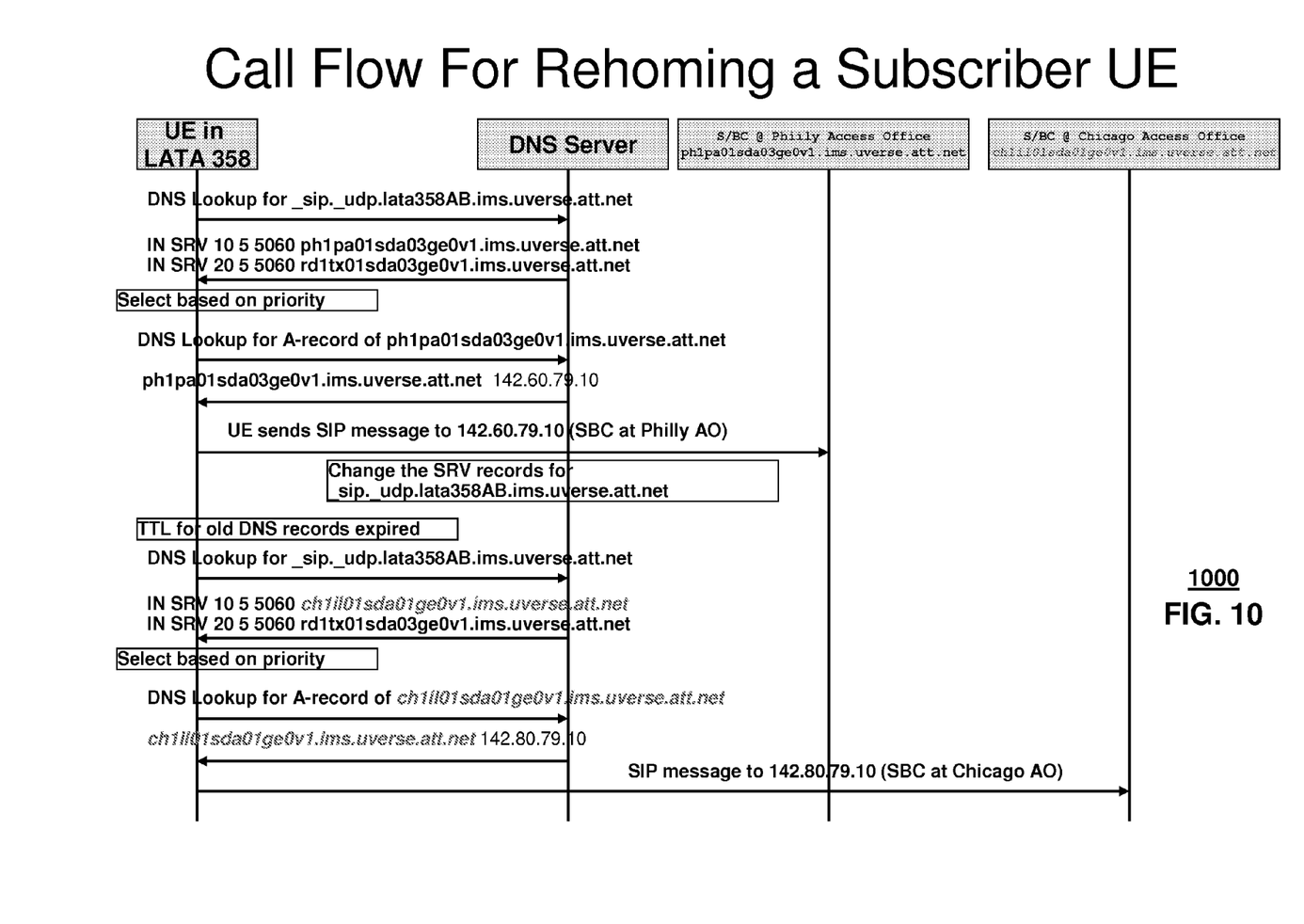

Thus when a service provider determines in step 626 that a need exists to rehome UEs in one or more LATAs or rate centers, it can direct the OSS 102 to update the logical FQDN directories previously discussed with new primary and/or secondary SRV records for the one or more FQDNs associated with the UEs that the service provider has determined need to be rehomed to another S/BC and/or Access Office. Once these changes take place, the OSS 102 can further be programmed in step 608 to re-provision one or more DNS servers with the updated SRV records of the affected FQDNs. Once the TTL timer of the UEs with the affected logical FQDNs expires, said UEs will query the DNS server with its FQDN and thereby retrieve the updated SRV records which causes a rehoming registration process such as the illustrative example shown in FIG. 10.

Because the OSS 102 limits the capacity of UE devices per LATA-based FQDN as shown by the last column of FIG. 7, a change in one FQDN will cause a limited burst of re-registrations by the affected UEs. Accordingly, the LATA-based FQDNs configured with a maximum subscriber capacity provide an effective means to manage re-registrations during maintenance, repairs, or redistributions of UEs. In cases were multiple FQDNs have been updated with new SRV records, the DNS server can be further programmed to supply the UEs differing TTLs to stagger the rehoming process, thereby preventing cumulative re-registrations.

Based on the aforementioned embodiments of method 600, the OSS 102 can serve several functions. First, it can be programmed to manage LATA-based FQDNs and sub-divisions thereof (e.g., rate centers). It can further manage the assignment of S/BCs to the FQDNs by way of SRV records. It can also track the number of UEs assigned to each LATA-based FQDN and prevent excessive registrations with a maximum subscriber capacity limit. For network management tasks such as maintenance, repairs, and network expansions, the OSS 102 can be further programmed to update the SRV records of the FQDNs and the DNS servers supply provisioning information to the UEs. The OSS 102 can also be programmed with network engineering rules. For example, it can audit the aforementioned directories to ensure that no S/BC has to home more than a certain number of UEs during regular operations.

From the foregoing descriptions, it would be evident to an artisan with ordinary skill in the art that the aforementioned embodiments can be modified, reduced, or enhanced without departing from the scope and spirit of the claims described below. Accordingly, the reader is directed to the claims for a fuller understanding of the breadth and scope of the present disclosure.

Figure 11:
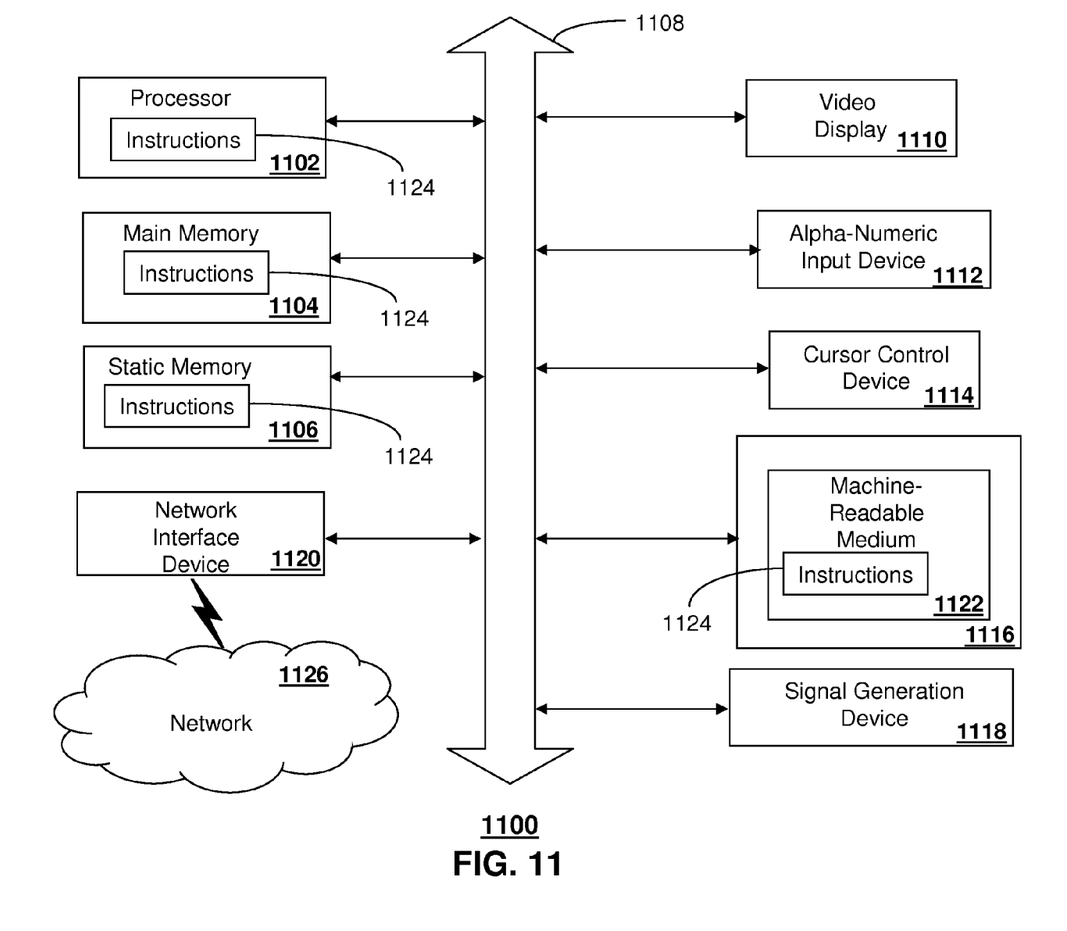
FIG. 11 depicts an illustrative diagrammatic representation of a machine in the form of a computer system within which a set of instructions, when executed, may cause the machine to perform any one or more of the methodologies disclosed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    associating a plurality of logical fully qualified domain names with at least one of a plurality of local access transport areas; and
    assigning to each of the plurality of logical fully qualified domain names a primary record and a secondary record, wherein the primary record comprises a first domain name system service record including a descriptor of a primary session border controller, wherein the secondary record comprises a second domain name system service record including a descriptor of a secondary session border controller, wherein the first domain name system service record is assigned a higher priority designation than the second domain name system service record, and wherein user endpoint devices register with one of the primary session border controller or the secondary session border controller according to the priority designation assigned to the first and second domain name system service records.

2. The method of claim 1, wherein the primary and secondary records correspond to service records conforming to a standard promulgated by an internet engineering task force.

3. The method of claim 1, comprising recording in a domain name system the plurality of logical fully qualified domain names with their corresponding primary and secondary records when user endpoint devices have been programmed with the logical fully qualified domain names.

4. The method of claim 3, wherein the user endpoint devices are programmed with the logical fully qualified domain names according to their local access transport area assignment.

5. The method of claim 3, wherein each of the user endpoint devices is operable to:
query the domain name system according to the logical fully qualified domain name assigned to the user endpoint device;
receive from the domain name system the primary and secondary records associated with the logical fully qualified domain name assigned to the user endpoint device; and
register with the primary session border controller as a preferred session border controller responsive to the first domain name system service record having the higher priority; and
register with the secondary session border controller responsive to an inability to establish stable communications with the preferred session border controller.

6. The method of claim 5, wherein the domain name system supplies each of the user endpoint devices a time to live indicator to direct the user endpoint device to repeat the query for information associated with its logical fully qualified domain name.

7. The method of claim 5, wherein the primary record comprises a first real fully qualified domain name, and wherein the secondary records comprises a second real fully qualified domain name.

8. The method of claim 7, wherein the first real fully qualified domain name corresponds to an internet protocol address of the primary session border controller, and wherein the second real fully qualified domain name corresponds to an internet protocol address of the primary session border controller.

9. The method of claim 1, comprising assigning a maximum subscriber capacity to each of the logical fully qualified domain names to prevent a flood of registrations by subscribers assigned to each logical fully qualified domain name.

10. The method of claim 9, comprising preventing exceeding the maximum subscriber capacity of each logical fully qualified domain name.

11. The method of claim 1, comprising subdividing each of the logical fully qualified domain names by local access transport areas and one or more rate centers within a local access transport area.

12. A domain name system server, comprising:
a memory storing computer instructions; and
a controller coupled to the memory, wherein responsive to executing the computer instructions, the controller is operable to:
record a plurality of logical fully qualified domain names associated with at least one of a plurality of local access transport areas or a plurality of subdivisions of at least one of the plurality of local access transport areas, wherein each of the logical fully qualified domain names comprises descriptors of a primary session border controller and a secondary session border controller, wherein the primary and secondary descriptors are stored in primary and secondary records, wherein the primary record is assigned a first priority and the secondary record is assigned a second priority, and wherein the first and second priorities differ;
receive a query from a user endpoint device for information associated with a select one of the plurality of logical fully qualified domain names; and
transmit to the user endpoint device the requested information.

13. The domain name system server of claim 12, wherein the primary and secondary records correspond to Service Records conforming to a standard promulgated by an internet engineering task force.

14. The domain name system server of claim 12, wherein the primary record comprises a first real fully qualified domain name, and wherein the secondary record comprises a second real fully qualified domain name.

15. The domain name system server of claim 14, wherein the first real fully qualified domain name corresponds to an internet protocol address of the primary session border controller, and wherein the secondary real fully qualified domain name corresponds to an internet protocol address of the primary session border controller.

16. The domain name system server of claim 12, wherein responsive to executing the computer instructions the controller is operable to receive from a system the plurality of logical fully qualified domain names with the primary and the secondary records.

17. The domain name system server of claim 12, wherein responsive to executing the computer instructions the controller is operable to supply the user endpoint device a time to live threshold with the requested information.

18. The domain name system server of claim 17, wherein the user endpoint device is operable to resubmit the query upon an expiration of timer provisioned according to the time to live threshold.

19. The domain name system server of claim 12, wherein each of the logical fully qualified domain names assigned to a local access transport area is subdivided into one or more rate centers.

20. A user endpoint device, comprising:
a memory storing computer instructions; and
a controller coupled to the memory, wherein responsive to executing the computer instructions, the controller is operable to:
submit a query to a domain name system server for information associated with a logical fully qualified domain name assigned to a local access transport area of the user endpoint device;
receive from the domain name system server a first descriptor of a primary session border controller and a second descriptor of a secondary session border controller, wherein the first and second descriptors are associated with the logical fully qualified domain name assigned to the local access transport area, and wherein the first descriptor has a first priority and the second descriptor has a second priority;

register with the primary session border controller responsive to the first priority being higher than the second priority; and register with the secondary session border controller responsive to an inability to establish stable communications with the primary session border controller.

21. The user endpoint device of claim 20, wherein responsive to executing the computer instructions the controller is operable to receive from a system the logical fully qualified domain name as provisioning information to manage communications of the user endpoint device.

* * * * *